(12) United States Patent
Martin et al.

(10) Patent No.: US 6,234,410 B1
(45) Date of Patent: May 22, 2001

(54) CLEANING DEVICE

(75) Inventors: Uwe Martin; Rolf-Dieter Schlein, both of Rotenburg; Rainer Kober, Darmstadt; Torsten Hahn, Homberg, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/416,789

(22) Filed: Oct. 13, 1999

(30) Foreign Application Priority Data

Oct. 15, 1998 (DE) .............................. 198 47 474

(51) Int. Cl.⁷ .................................. B05B 1/10; B60S 1/46
(52) U.S. Cl. ...................................... 239/284.2; 239/284.1
(58) Field of Search .......................... 239/284.1, 284.2, 239/203, 261.1

(56) References Cited

U.S. PATENT DOCUMENTS

| 5,269,464 | * | 12/1993 | Epple et al. | 239/284.2 |
| 5,762,271 | * | 6/1998 | Lind et al. | 239/284.2 |
| 5,769,323 | * | 6/1998 | Hartick et al. | 239/284.2 |

* cited by examiner

*Primary Examiner*—Lesley D. Morris
*Assistant Examiner*—Davis Hwu
(74) *Attorney, Agent, or Firm*—Martin A. Farber

(57) ABSTRACT

A cleaning device for a motor vehicle headlight lens, a washer nozzle (6) is arranged on a support (11) having tubes (12, 13) which can be moved in the manner of a telescope. An outer tube (12) of the support (11) can be moved by an adjusting arrangement (5) having an electric motor (19). A connecting branch (16) for a washer fluid line (9) is latched to a fixed guide sleeve (14). As a result, the cleaning device is of particularly compact construction.

11 Claims, 3 Drawing Sheets

CLEANING DEVICE

FIELD AND BACKGROUND OF THE INVENTION

The invention relates to a cleaning device for a motor vehicle headlight lens, having a support which is to be connected to a washer fluid line, having at least one washer nozzle which is arranged on the support, and having an adjusting arrangement which has an electric motor and is intended for moving the washer nozzle between an inoperative position and a second position in front of the lens.

A cleaning device of this type is disclosed by DE 196 30 421. In this cleaning device the support has an external thread which is in engagement with a spindle wheel which can be driven by the electric motor. A common housing of the adjusting arrangement and of the spindle wheel serves as an axial guide for the support. The washer fluid line is configured as a flexible tube and shaped to form a loop so that its end which is connected to the support can be carried along on it. An advantage of this known cleaning device resides in the fact that the movement of the washer nozzle can be controlled by the adjusting arrangement irrespective of a flow and a pressure in the washer fluid line. By this means, by alternate cleaning of the headlights, for example, it can be ensured that in each case only one of the headlights is covered by the washer nozzle.

A disadvantage of the known cleaning device is that the washer fluid line has to be shaped to form a very large loop to enable its end which is connected to the support to be carried along by it without any kinks. Also, since the loop has to be fastened or guided in the motor vehicle in a flexible manner to avoid chafing, this results in the cleaning device being cost-intensive to design and install. Furthermore, this loop requires a very large amount of space which in current motor vehicles is generally very limited in the region of the headlights.

SUMMARY OF THE INVENTION

The invention is based on the object of further developing a cleaning device of the type mentioned at the beginning in such a manner it requires particularly little space and can be fitted in the motor vehicle cost-effectively.

According to the invention, this problem is solved in that the support has tubes which can be pushed one into another in the manner of a telescope, and in that the adjusting arrangement is for moving the tubes apart and retracting them as desired.

By means of this design, that region of the support which is connected to the washer fluid line is configured as a fixed component. It is therefore not necessary for the washer fluid line to be shaped to form a loop. As a result, the cleaning device according to the invention is of particularly compact configuration. Since the cleaning device only has fixed components, apart from the tube which supports the washer nozzle, it can be fitted in the motor vehicle in a particularly simple manner. A further advantage of this resides in the fact that during movement of the washer nozzle the washer fluid line cannot be damaged by chafing against adjacent components of the motor vehicle.

The adjusting arrangement could, for example, be provided for moving the inner tube of the support. However, in this case driving means of the adjusting arrangement would have to act on the inner tube. This results in a complicated form of the cleaning device according to the invention. The cleaning device according to the invention requires a particularly low constructional outlay if the adjusting arrangement is provided for moving an outer tube of the support.

For moving the washer nozzle, the outer tube could, as in the case of the known cleaning device, have an external thread which is in engagement with a spindle nut. However, this requires a straight design of the tubes. According to another advantageous development of the invention, the tubes may be straight or have circular arc sections as desired, if the outer tube has a toothed rack which is in engagement with the adjusting arrangement. Since the toothed rack has only to be arranged on that side which faces the adjusting arrangement, the cleaning device according to the invention has particularly small constructional dimensions. A further advantage of this resides in the fact that in comparison to the external thread the toothed rack is less susceptible to malfunctioning in the event of becoming dirty.

According to an advantageous development of the invention, the washer nozzle is reliably retained in its inoperative position or in the second position without additionally to be arranged retaining means, if the adjusting arrangement has a worm gearing.

The washer nozzle could, for example, be arranged directly on one of the tubes of the support. However, the cleaning device according to the invention can be adapted for differently designed lenses and for an envisaged arrangement of the cleaning device in front of the lens in a simple manner with small constructional changes, if a nozzle holder is arranged between the washer nozzle and one of the tubes of the support. This nozzle holder can be configured very simply for the mounting of a plurality of washer nozzles arranged above or next to one another in a manner appropriate to the lens to be cleaned, and can be replaced in a simple manner.

The cleaning device could have a nonreturn valve which opens at a designated pressure. A nonreturn valve of this type can prevent the emergence of washer fluid from the washer nozzles while the motor vehicle is cornering. Also, a close arrangement of the nonreturn valve results in the cleaning device having a very short reaction time. According to another advantageous development of the invention, a nonreturn valve of this type can be avoided in a simple manner, if the nozzle holder has a sealing element which closes the inner tube in the inoperative position of the washer nozzle. This sealing element has the same effect as the nonreturn valve and is arranged particularly close to the washer nozzle.

According to another advantageous development of the invention, the sealing element is configured in a structurally particularly simple manner if it has a peg which penetrates into the inner tube in the inoperative position, and if the peg has a sealing ring on its free end. A further advantage of this design resides in the fact that by this means the sealing element is independent of pressure. Emergence of washer fluid from the washer nozzle when the support is blocked is thereby prevented. Also, the length of the peg makes it possible to specify in a very simple manner from which position washer fluid is to emerge from the washer nozzle. As a result, the washer nozzle can be moved in a specific manner into a starting position in which emergence of washer fluid from the washer nozzle is possible.

The cleaning device according to the invention can be adapted in a simple manner to restricted space conditions in the region in front of the lens, if the adjusting arrangement is connected to the outer tube via a flexible shaft. By this means, the electric motor together with the gearing can be arranged at a location at which sufficient space is available.

A contribution to further reducing the dimensions and the manufacturing costs of the cleaning device according to the invention is made if a housing of the adjusting arrangement and a guide sleeve are configured in one piece. Furthermore, the cleaning device according to the invention can be preassembled and tested in a very simple manner outside the motor vehicle.

The connection of the cleaning device according to the invention to a washer fluid line already laid in the motor vehicle is configured in a particularly simple manner if the guide sleeve is configured in the form of a cup and in the bottom region has a connecting branch which is connected to the inner tube and is intended for the washer fluid line. Furthermore, that region of the cleaning device according to the invention which supports the connecting branch thereby has particularly high stability.

A contribution to further simplifying the installation of the cleaning device according to the invention is made if the bottom region of the guide sleeve is manufactured in one piece with the connecting branch and the inner tube, and if the guide sleeve and the bottom region are connected by means of a latching connection.

BRIEF DESCRIPTION OF THE DRAWINGS

The invention permits numerous embodiments. To further clarify its basic principle one of these is represented in the drawing and is described in the following. In the drawing

DETAILED DESCRIPTION OF THE PREFERRED EMBODIMENT

Figure 1:
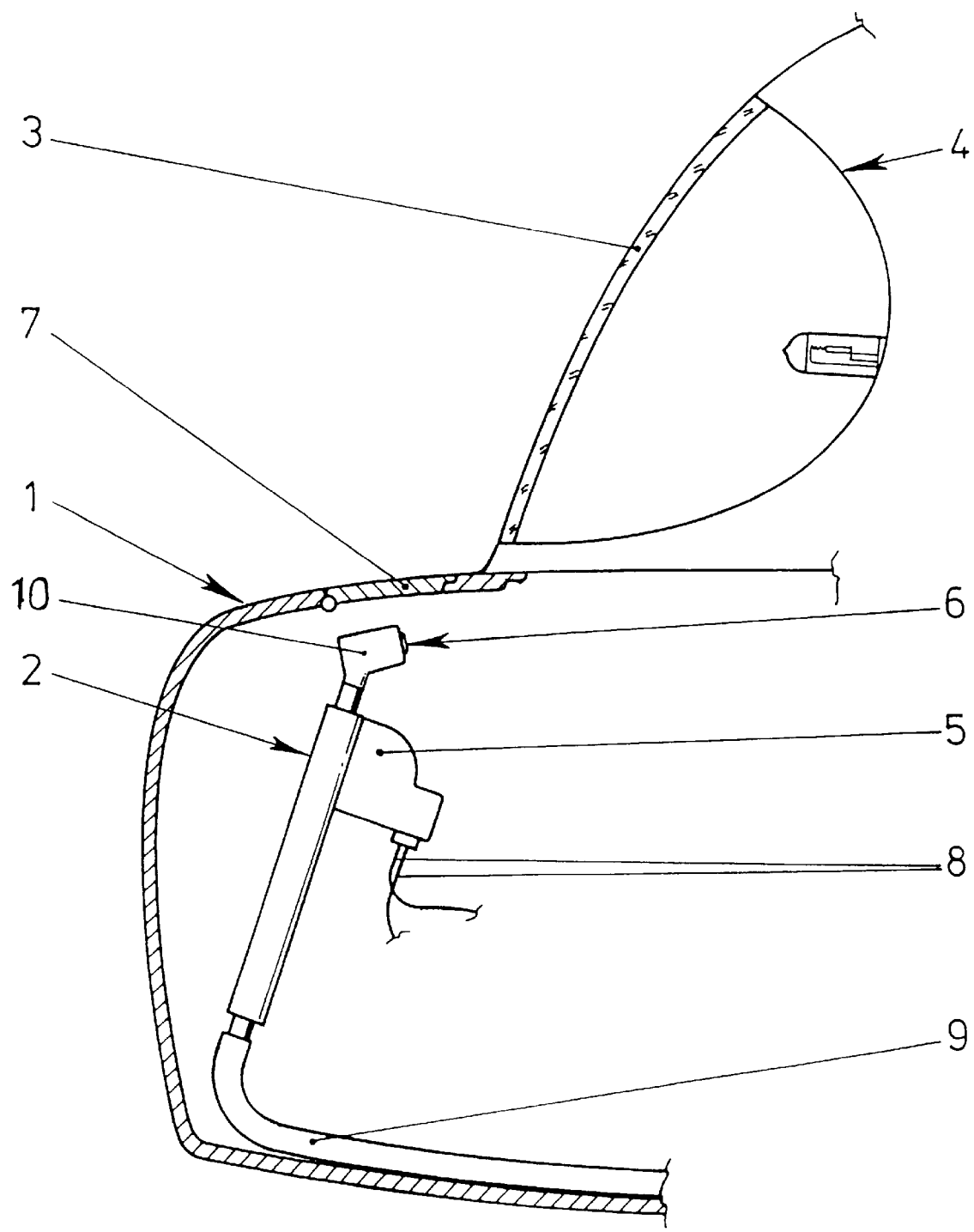
FIG. 1 shows, in an initial position, a cleaning device according to the invention which is fitted in front of a lens.

FIG. 1 shows a cleaning device 2 according to the invention which is fitted in a front fender 1 of a motor vehicle. A lens 3 of a headlight 4 is arranged above the fender 1. The cleaning device 2 has a washer nozzle 6 which can be moved by an adjusting arrangement 5. The washer nozzle 6 is situated here in an inoperative position below a flap 7 of the fender 1. Electrical lines 8 for the adjusting arrangement 5 and a washer fluid line 9 are connected to the adjusting arrangement 5. The washer nozzle 6 is supplied with washer fluid by a pump which is not shown.

Figure 2:
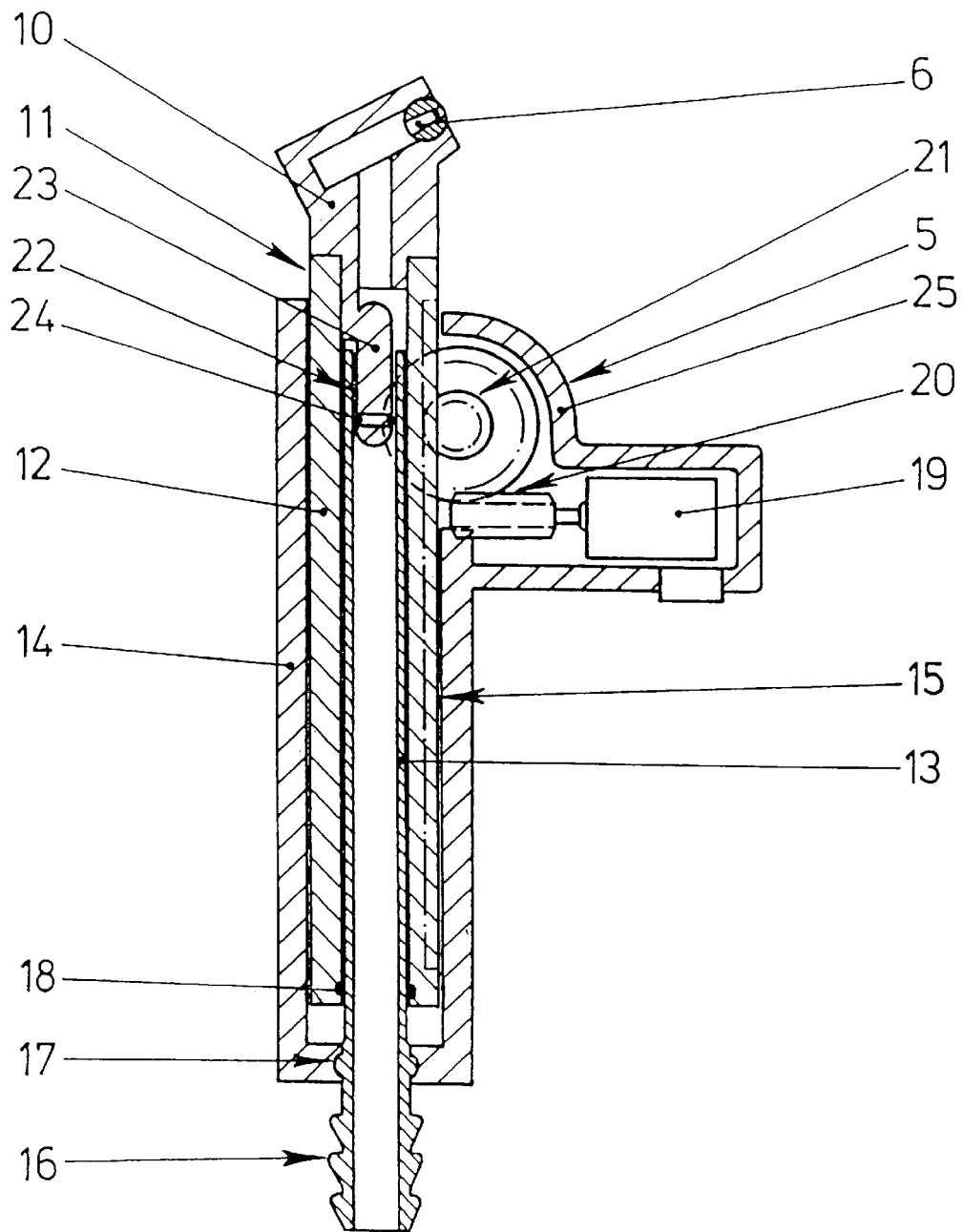
FIG. 2 shows the cleaning device from FIG. 1 in a longitudinal section.

FIG. 2 shows the cleaning device 2 from FIG. 1 in a longitudinal section. The washer nozzle 6 is arranged on a nozzle holder 10 which for its part is fastened on a support 11. The support 11 has two tubes 12, 13 which can be pushed one into the other in the manner of a telescope. The outer tube 12 is arranged within a guide sleeve 14 and has a toothed rack 15 on its side which faces the adjusting arrangement S. The inner tube 13 has a connecting branch 16 for the washer fluid line 9 shown in FIG. 1 and penetrates the guide sleeve 14 in a bottom region. At this location the inner tube has a latching connection 17 to the guide sleeve 14. The inner tube 13 is sealed off in the region of the latching connection 17 with respect to the guide sleeve 14. The outer tube 12 has a sealing ring 18 which is prestressed against the tube 13. The adjusting arrangement 5 has an electric motor 19 which is connected via a worm gearing 20 to a step-down gear 21. The step-down gear 21 is in engagement with the toothed rack 15 of the outer tube 12. By this means, the outer tube 12 can be moved together with the washer nozzle 6. The electric motor 19 is arranged perpendicularly to the toothed rack 15 of the outer tube 12. When space conditions are appropriate, the electric motor 19 can also be arranged in front of the lens 3, shown in FIG. 1, parallel to the toothed rack 15 or can be connected to the worm gearing 20, via a flexible shaft which is not shown, or directly to the step-down gear 21. The guide sleeve 14 and a housing 25 of the adjusting arrangement 5 are configured in one piece.

The nozzle holder 10 has a sealing element 22 which closes the inner tube 13 in the indicated position. The sealing element 22 has a peg 23 which penetrates into the inner tube 13 and has a sealing ring 24. By this means, washer fluid can then only pass to the washer nozzle 6 if the outer tube 12 is extended sufficiently far for the sealing ring 24 to be situated outside the inner tube 13. When the support 11 is jammed in the indicated inoperative position of the washer nozzle 6, no washer fluid can therefore be sprayed into the bumper 1 shown in FIG. 1. The length of the peg 23 can therefore make it possible to specify from which position of the washer nozzle 6 in front of the lens 3 shown in FIG. 1 washer fluid can emerge from the washer nozzle 6.

Figure 3:
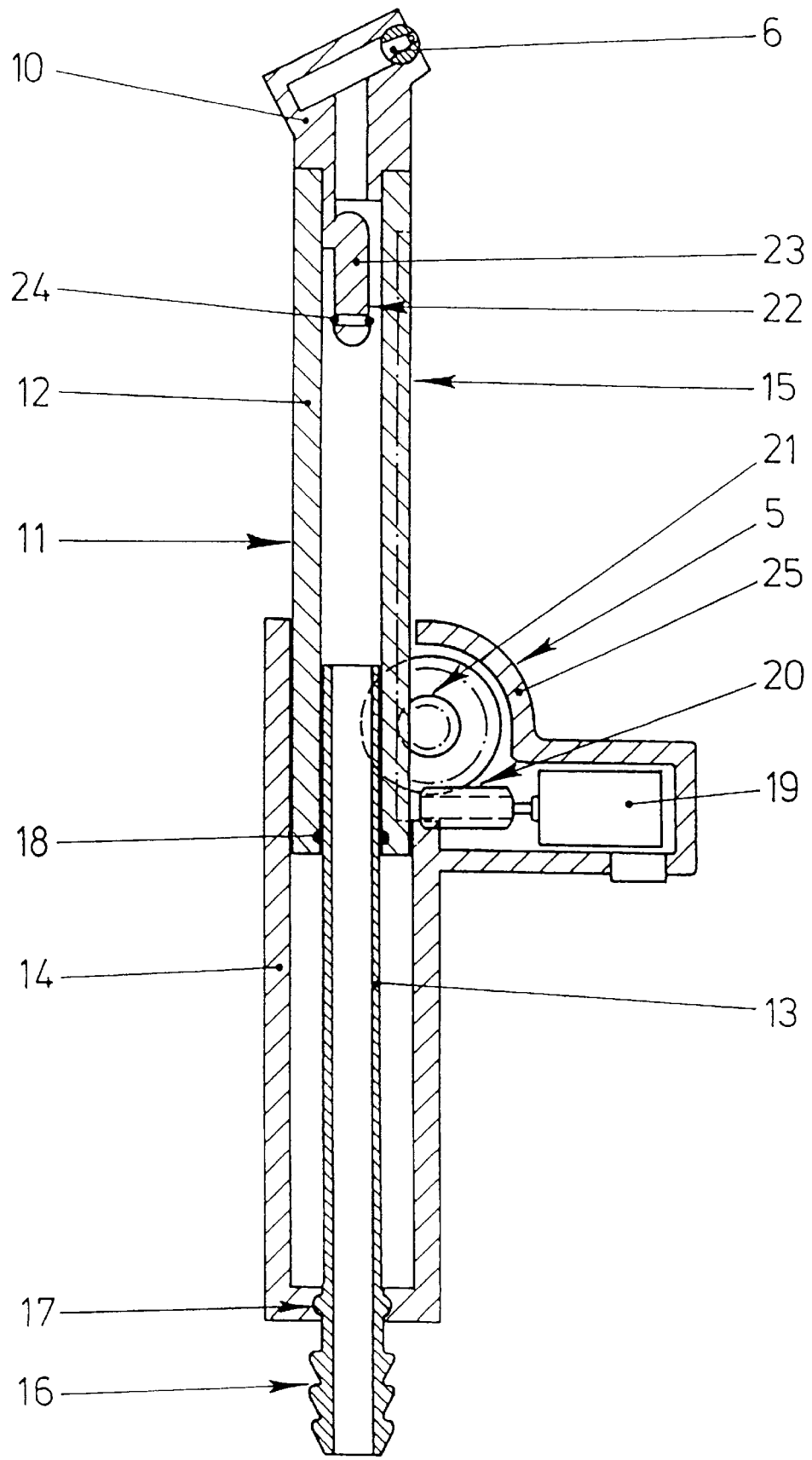
FIG. 3 shows the cleaning device from FIG. 1 in an extended position of the washer nozzle.

FIG. 3 shows the cleaning device 2 according to the invention from FIG. 1 in an extended end position. The sealing ring 24, which is arranged on the peg 23, is situated outside the inner tube 13, so that washer fluid can pass from the connecting branch 16 as far as the washer nozzle 6.

What is claimed is:

1. A cleaning device for a motor vehicle headlight lens, having a tubular support which is to be connected to a washer fluid line, having at least one washer nozzle which is arranged on the support, and having an adjusting arrangement which has an electric motor and is intended for moving the washer nozzle between an inoperative position and a second position in front of the lens, wherein the support comprises a first tube and a second tube movable in telescoping manner along the first tube between the inoperative position and the second position, the second tube carrying the washer nozzle, the first tube having a fixed orientation for directing the second tube to the second position, the adjusting arrangement being coupled to the support for introducing relative motion between the first tube and the second tube.

2. The cleaning device as claimed in claim 1, wherein, in a telescoping arrangement of the first tube and the second tube of the support, the first tube is an inner tube and the second tube is an outer tube, and the adjusting arrangement is provided for moving the outer tube.

3. The cleaning device as claimed in claim 1, wherein, in a telescoping arrangement of the first tube and the second tube of the support, the first tube is an inner tube and the second tube is an outer tube, and the outer tube has a toothed rack which is in engagement with the adjusting arrangement.

4. The cleaning device as claimed in claim 1, wherein the adjusting arrangement has a worm gearing.

5. The cleaning device as claimed in claim 1, wherein a nozzle holder is arranged between the washer nozzle and one of the tubes of the support.

6. The cleaning device as claimed in claim 1, wherein, in a telescoping arrangement of the first tube and the second tube of the support, the first tube is an inner tube and the second tube is an outer tube, and the adjusting arrangement is connected to the outer tube via a gear.

7. The cleaning device as claimed in claim 1, wherein a housing of the adjusting arrangement and a guide sleeve for the second tube are configured in one piece.

8. A cleaning device for a motor vehicle headlight lens, having a tubular support which is to be connected to a washer fluid line, having at least one washer nozzle which is arranged on the support, and having an adjusting arrangement which has an electric motor and is intended for moving the washer nozzle between an inoperative position and a second position in front of the lens, wherein the support has tubes which can be pushed one into another in the manner of a telescope, wherein the adjusting arrangement is for moving the tubes apart and retracting them as desired, wherein a nozzle holder is arranged between the washer nozzle and one of the tubes of the support, wherein, in a telescoping arrangement of the first tube and the second tube of the support, the first tube is an inner tube and the second tube is an outer tube, and wherein the nozzle holder has a sealing element which closes the inner tube (13) in the inoperative position of the washer nozzle.

9. The cleaning device as claimed in claim 8, wherein the sealing element has a peg which penetrates into the inner tube in the inoperative position, and wherein the peg has a sealing ring on its free end.

10. A cleaning device for a motor vehicle headlight lens, having a tubular support which is to be connected to a washer fluid line, having at least one washer nozzle which is arranged on the support, and having an adjusting arrangement which has an electric motor and is intended for moving the washer nozzle between an inoperative position and a second position in front of the lens, wherein the support has tubes which can be pushed one into another in the manner of a telescope, wherein the adjusting arrangement is for moving the tubes apart and retracting them as desired, wherein a housing of the adjusting arrangement and a guide sleeve are configured in one piece, and wherein the guide sleeve is configured in the form of a cup and in the bottom region has a connecting branch which is connected to the inner tube and is intended for the washer fluid line.

11. The cleaning device as claimed in claim 10, wherein the bottom region of the guide sleeve is manufactured in one piece with the connecting branch and the inner tube, and wherein the guide sleeve and the bottom region are connected by means of a latching connection.

* * * * *